United States Patent [19]

Lisec

[11] Patent Number: 4,803,775

[45] Date of Patent: Feb. 14, 1989

[54] DEVICE FOR THE ATTACHMENT OF SPACER FRAMES

[76] Inventor: Peter Lisec, Bahnhofstrasse 34, A-3363 Amstetten-Hausmening (Niederosterreich), Austria

[21] Appl. No.: 57,943

[22] Filed: Jun. 3, 1987

[30] Foreign Application Priority Data

Jun. 5, 1986 [AT] Austria ................................ 1534/86
Jul. 30, 1986 [AT] Austria ................................ 2057/86

[51] Int. Cl.[4] ............................................ C03C 27/12

[52] U.S. Cl. ........................................ 29/822; 29/823; 29/281.1; 29/281.4; 29/283; 269/50

[58] Field of Search ...................... 29/822, 823, 281.1, 29/281.4, 281.5, 283; 269/50, 51

[56] References Cited

FOREIGN PATENT DOCUMENTS 0007427 3/1981 Austria .
3223848 6/1983 Fed. Rep. of Germany .
3222903 12/1983 Fed. Rep. of Germany .

*Primary Examiner*—Timothy V. Eley
*Assistant Examiner*—Taylor J. Ross
*Attorney, Agent, or Firm*—Young & Thompson

[57] ABSTRACT

A device for the attachment of spacer frames (18) to glass panes (5) during the course of the manufacture of insulating glass panes comprises a frame-like holder (8) for the spacer frames (18), the upper, horizontal leg (11) of the frame-like holder (8) being displaceable upwards and downwards. At least two grippers (30) equipped with hooks (50) are mounted to the upper, horizontal leg (11) of the frame-like holder, these grippers being movable to and fro, for the insertion of spacer frames (18) in the device, between a take-over position associated with the end of an overhead conveyor (19) for spacer frames (18) and a delivery position wherein the spacer frames (18) are set into the frame-like holder (8). The hooks (50) are pivotably mounted to the grippers (30) so that they can be moved out of the range of the spacer frame (18) during the return movement of the grippers (30) into the take-over position. Furthermore, lifting members (55) are provided at the lower leg (10) of the frame-like holder. By an upward pivoting of the lifting members (55), the lower leg of a spacer frame (18) is reliably moved onto the clamping means (16).

23 Claims, 5 Drawing Sheets

DEVICE FOR THE ATTACHMENT OF SPACER FRAMES

Figure 2:
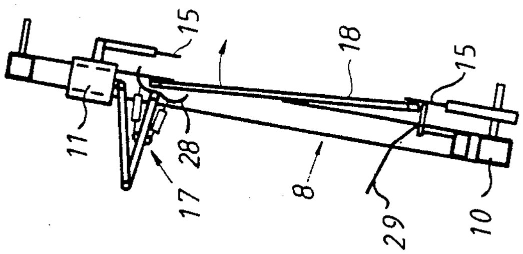

The invention relates to a device for the attachment of spacer frames to glass panes during the course of the manufacture of insulating glass panes, with an essentially vertically disposed supporting wall for the glass panes and with a frame-like holder for the spacer frames arranged in front of the supporting wall, wherein clamping devices and retractable locating pins for the spacer frame to be attached are arranged at the frame-like holder, and wherein the upper, horizontal leg of the frame-like holder can be displaced upwards and downwards in parallel to the supporting wall.

Such a device has been known, for example, from DE-C No. 32 23 848. The spacer frames are placed in the conventional device either manually or with the aid of an installation for transferring coated spacer frames from a conveyor, on which the spacer frames are transported while freely hanging on hooks to a take-over point, into the device for attaching spacer frames. A device for the transferring of coated spacer frames is known from DE-C No. 32 22 903.

One disadvantage in the conventional device for transferring spacer frames from a conveyor into a device for attaching spacer frames to glass panes resides in that it takes a large amount of space and, in particular, must be built with very large vertical dimensions.

The invention is based on the object of further developing a device of the type discussed hereinabove, as known from DE-C No. 32 23 848 or from published Austrian Patent Application A No. 6955/78, in such a way that there is no longer any need for a separate transfer installation for the spacer frames.

This has been achieved according to the invention by mounting at least two grippers to the upper, horizontal leg of the frame-like holder, these grippers being movable to and fro between a take-over position associated with the end of an overhead conveyor for spacer frames and a delivery position wherein the spacer frames are put down while in contact with the locating pins of the frame-like holder.

The solution according to this invention is distinguished by a surprising simplicity inasmuch as the horizontally extending, upwardly and downwardly adjustable upper leg of the frame-like holder, by means of which holder the spacer frames during attachment thereof to the glass pane standing in the attaching device are held in exact alignment, serves as a support for the grippers taking over the spacer frames from the overhead conveyor.

In a practical embodiment, the provision can be made that the grippers exhibit at least two arms that are articulated together. By means of this arrangement, the vertical stroke that has to be executed by the horizontally extending leg of the frame-like holder during transfer of the spacer frames from the horizontal conveyor into the attachment device is reduced.

In a similar manner as known from DE-C No. 32 22 903, the provision can be made within the scope of this invention that a ring claw is arranged at the free end of each gripper or of the offer arm thereof, at least one ring segment being pivotable with respect to the other for the opening and closing of the ring claw.

According to another embodiment, it is possible to provide, at the free end of each gripper or of the outer arm thereof, a clamp for seizing spacer frames in the take-over position of the gripper. This embodiment has the advantage that an exactly controlled insertion of the spacer frame in the attachment device is made possible.

According to another embodiment of the invention, the grippers can be equipped with hooks at their free ends, which hooks are optionally pivotably mounted.

In order to simplify that delivery of the spacer frames, the provision can be made according to this invention that the free ends of the hooks, in the lower end position of the grippers, are aligned essentially horizontally and are arranged below the section of the hooks by way of which the hook is pivotably mounted to the gripper. In this particularly simple embodiment of the invention, the hooks can then be moved in an especially simple way out of the spacer frame standing in the frame-like holder and perhaps already seized by the clamping means.

In a practical embodiment of the invention, the provision can be made that the free ends of the hooks, in the lower end position of the grippers, are out of engagement with the spacer frames in contact with the locating pins. In this arrangement, the hooks can be swung upwardly unimpeded by the spacer frames.

According to one embodiment of the invention, it is possible to provide, at the lower horizontal leg of the frame-like holder, at least one lifting member for lifting the lower horizontal frame leg of a spacer frame. This embodiment has the advantage that an exactly controlled insertion of also the lower, horizontal leg of the spacer frame in the attachment device is possible without the grippers having to lift this spacer frame very high.

Figure 1:
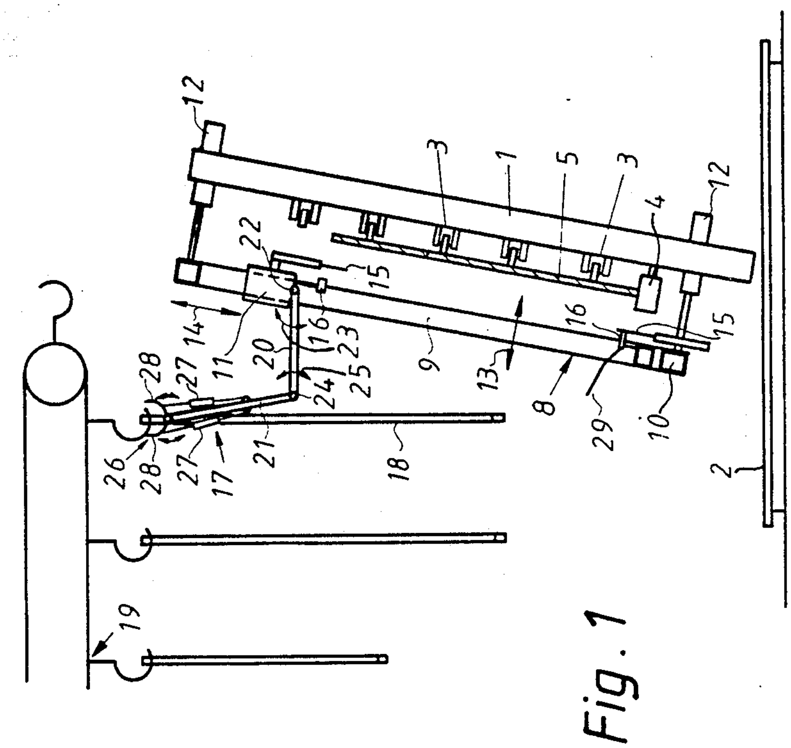
Figure 3:
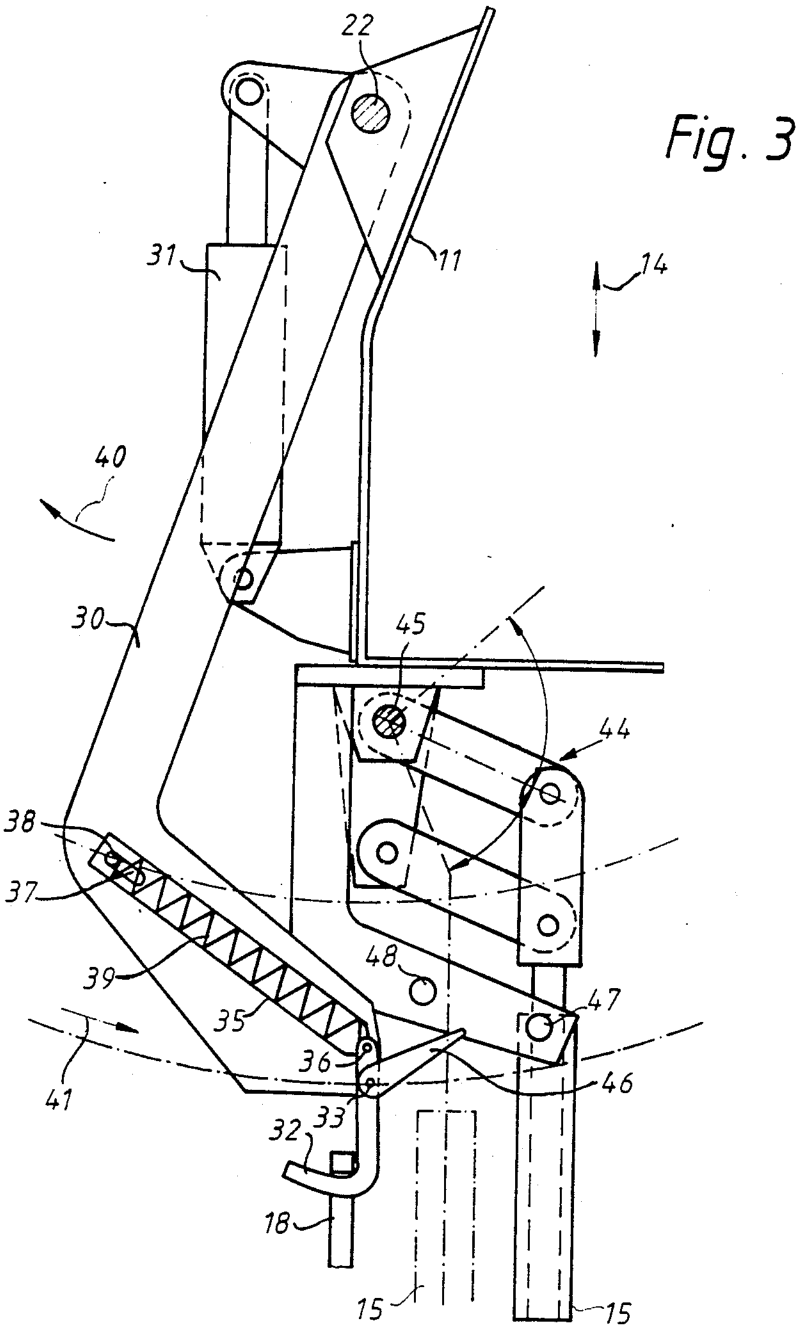
Figure 4:
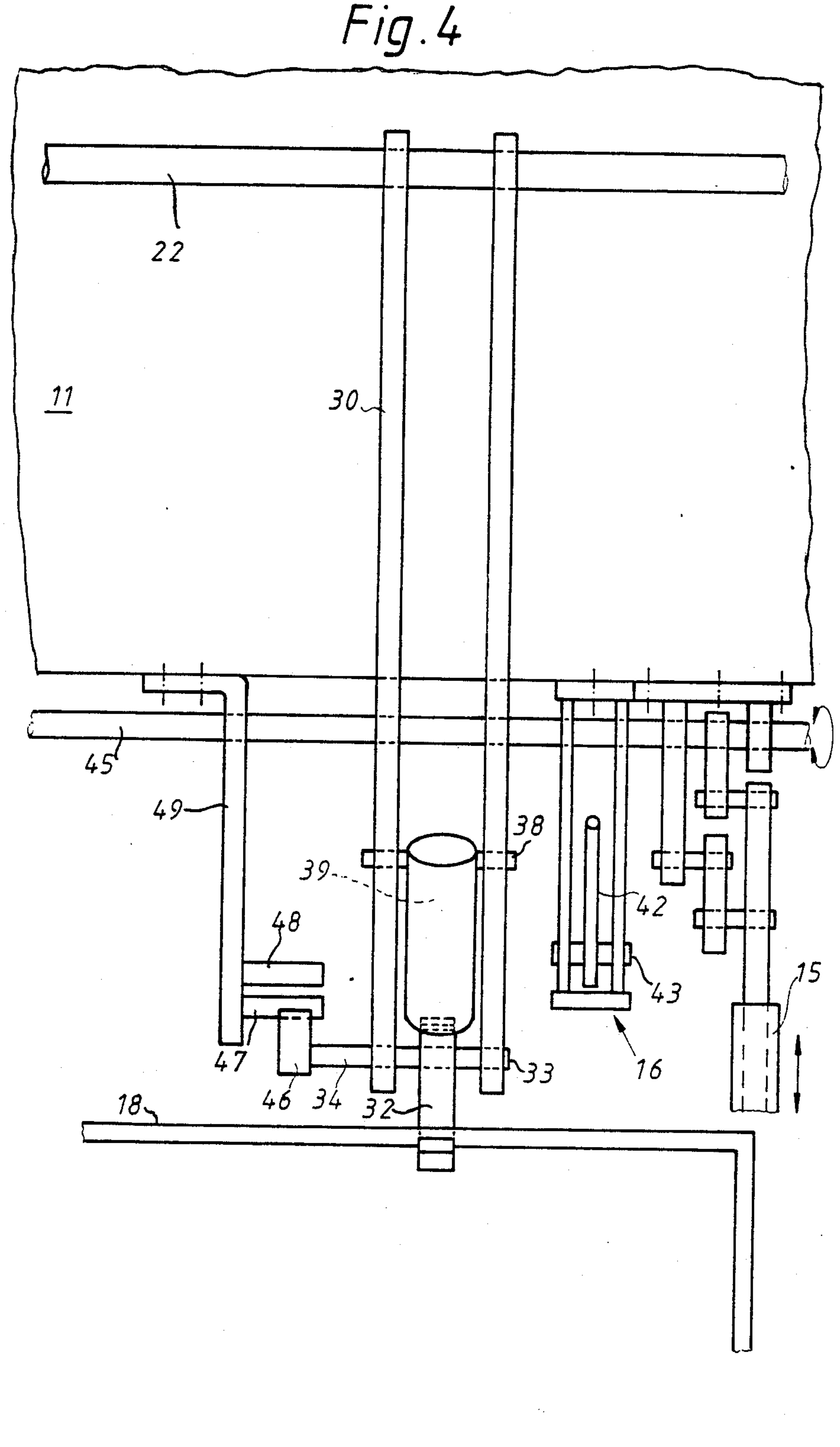
Figure 6:
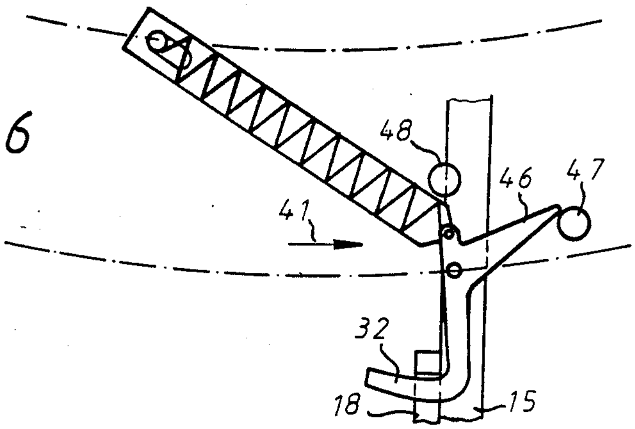
Figure 7:
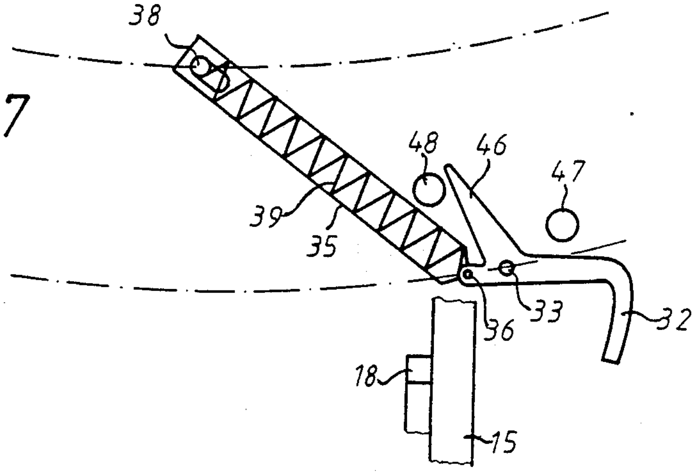
Figure 9:
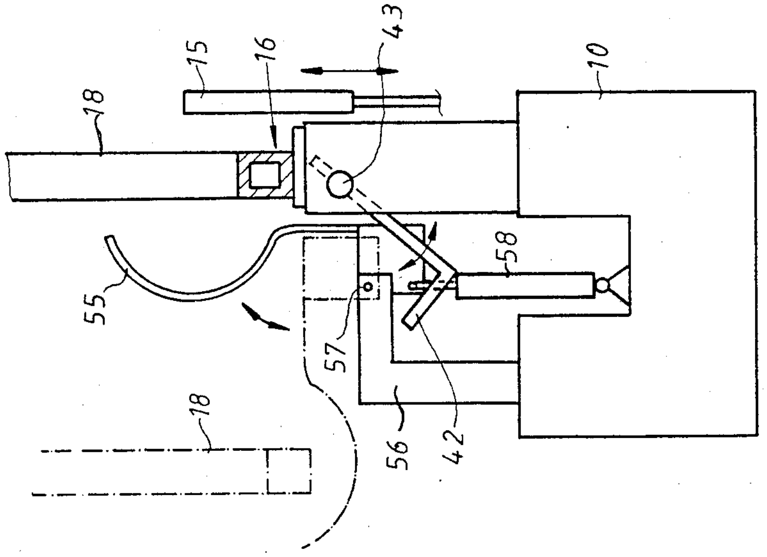
Figure 8:
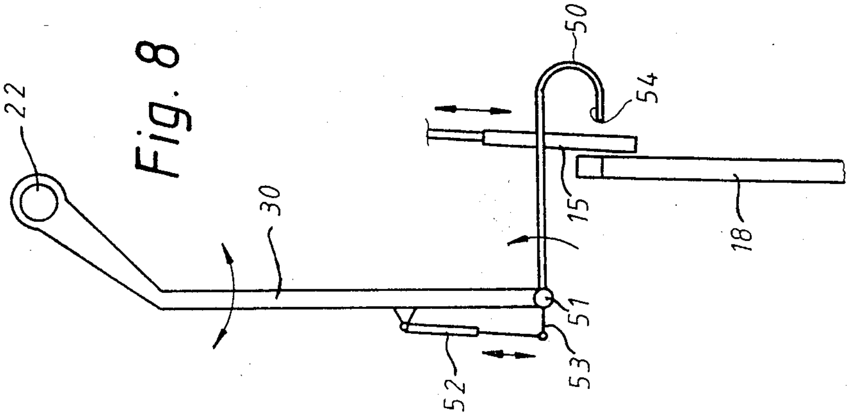

Additional details and features of the invention can be seen from the dependent claims and the following description wherein reference is had to the appended drawings wherein:

FIG. 1 shows, in a vertical section, a device of this invention realized in connection with an attachment device of the type of structure known from DE-C No. 32 23 848, FIG. 2 shows a partial view of the device of FIG. 1 in a different working stage, FIG. 3 shows, in a lateral view, a detail of an embodiment wherein the grippers carry pivotable hooks at their ends, FIG. 4 shows, in a partial frontal view, the embodiment of FIG. 3, FIGS. 5–7 show details of the device of FIGS. 3 and 4 in various working stages, FIG. 8 shows, in a lateral view, a detail of an embodiment of the device according to this invention wherein the grippers carry pivotable hooks at their ends, and FIG. 9 shows, in a lateral view, the lower part of the frame-like holder with a lifting member.

The device according to this invention for the attachment of spacer frames to glass panes comprises, in the embodiment illustrated in FIGS. 1 and 2, a supporting wall 1 standing on the floor by way of feet 2. The supporting wall 1 is inclined slightly rearwardly with respect to the vertical, for example by about 5°, and exhibits on its front side several supporting rollers 3 rotatable freely about essentially vertical axes. Conveyor rollers 4 are provided at the lower edge of the supporting wall 1, these rollers being rotatable about essentially horizontal axes. The conveyor rollers 4 serve for conveying glass panes 5 into a defined final position in the device.

At a spacing with respect to the supporting wall 1 in front thereof, a frame-like holder 8 aligned in parallel to the supporting wall 1 is provided, this holder comprising two substantially vertical legs 9, a lower, horizontal leg 10, and an upper, horizontal leg 11. The frame-like holder 8 can be moved by way of pressure medium cylinders 12 toward the supporting wall 1 and away therefrom (arrow 13). In place of the pressure medium cylinders 12, it is also possible to provide rack-and-pinion drive mechanisms for moving the frame-like holder 8 with respect to the supporting wall 1.

The upper, horizontal leg 11 of the frame-like holder 8 can be displaced upwards and downwards in the direction of the double arrow 14. The displaceability of the upper, horizontal leg 11 serves for adapting the height of the frame-like holder 8 to the dimensions of the spacer frame to be attached. Additionally, one of the vertical legs 9, especially the leg 9 which is the rearward leg based on the direction in which glass panes 5 are conveyed into the device, can be adjustable in the conveying direction, i.e. perpendicularly to the plane of illustration of FIG. 1 so that the horizontal dimension of the holder 8 can be adapted to the length of a spacer frame 18 to be attached.

Locating pins 15 and clamping means 16 are provided at the frame-like holder 8 at the two horizontal legs 10 and 11 as well as at least at the vertical leg 9 arranged on the outlet side—preferably also at the leg 9 on the inlet side, especially if this leg is adjustable. The locating pins 15 and the clamping means 16 (only the stops thereof, attached in this embodiment to the holder 8, are illustrated) can be designed as known from DE-C No. 32 23 848 or from published Austrian Patent Application No. A 6955/78.

As for the mode of operation of the just-described device for attaching spacer frames to a glass pane, reference is had to DE-C No. 32 23 848.

At least two grippers 17 are provided at the upper, horizontal leg 11 of the frame-like holder 8, these grippers being movable between a position wherein they take over coated spacer frames 18 from a horizontal overhead conveyor 19 ("take-over position", FIG. 1) and a position wherein they deliver the previously taken-off spacer frame 18 while in contact with the locating pins 15 of the frame-like holder 8 into the device for attaching the spacer frames to glass panes 5 ("delivery position", FIG. 2).

In the embodiment illustrated in FIGS. 1 and 2, the grippers 17 exhibit two arms 20, 21, connected by articulation with each other, wherein the arms 20 are mounted on a shaft 22 extending in parallel to the upper, horizontal leg 11 of the frame-like holder 8 and rotatable in the direction of the double arrow 23 with the aid of a drive mechanism, no shown, for pivoting the arms 20 and thus the grippers 17 proper, between the takeover position and the delivery position. The articulated connection 24 between the arms 20 and 21 of the grippers 17 is associated with drive mechanisms not shown in detail (for example pressure medium motors or servomotors, etc.), so that the arm 21 can be swung in the direction of the double arrow 25 with respect to the arm 20.

The arm 21 carries at its free end a ring claw 26 which latter, in the illustrated embodiment, consists of two ring halves 28 pivotable with the aid of pressure medium motors 27. It is also possible to use an arrangement with a rigid ring half and a pivotable ring half, as known from DE-C No. 32 22 903.

In case a spacer frame 18 is to be taken off from the overhead conveyor 19, the grippers 17 are placed into a position wherein their claws 26 seize the spacer frame, suspended at the overhead conveyor 19, at its upper, horizontal leg (FIG. 1). For this purpose, the arms 20 and 21 are operated correspondingly, the ring claw 26 is opened, and the upper, horizontal beam 11 of the frame-like holder 8 is moved upwards.

As soon as a spacer frame 18 has been seized by the grippers 17, the upper, horizontal leg 11 of the frame-like holder 8 moves into the position it has to occupy when attaching a spacer frame to the glass pane 5, i.e. into the position corresponding to the height of the spacer frame 18. At the same time, or also precedingly, the grippers 17 are moved into the position illustrated in FIG. 2, and their ring claws 26 are opened, during which step an opening of the then lower ring half 28 takes place, in particular. The spacer frame 18 then rests on the clamping jaws of the lower clamping means 16 and reposes, after the complete opening of the ring claws 26, against the upper locating pins 15 mounted to the beam 11. Then the grippers 17 and, in particular, their ring claws 26 are swung out of the range of the frame-like holder 8, and attachment of the spacer frame 18 to the glass pane 5 can be continued as disclosed in DE-C No. 32 23 848.

In order to facilitate the feeding of the spacer frame 18 onto the clamping jaws of the lower clamping means 16, the latter can be equipped with guiding installations 29.

The grippers 30 of the embodiment shown in FIGS. 3–7 re fashioned to be of one piece; they have an optionally, multiangular configuration and are mounted fixedly to the shaft 22 common to all of them, for rotation therewith. A pressure medium motor 31 is provided for rotating the shaft 22, which latter is mounted at the upper, horizontal leg 11 of the holder 8.

The grippers 30 carry at their free ends a hook 32 which is mounted to be pivotable about an axle 33 with respect to the gripper 30. The hook 32 has an extension projecting beyond the shaft 22 and connected via a joint 36 to a tubular section 35. The tubular section 35 has slotted holes 37 at its end lying in opposition to the joint 36, these slotted holes being penetrated by a peg 38 attached to the gripper 30. A helical compression spring 39 is provided in the tube 35 and is supported, on the one hand, at the free end of the extension of hook 32 and, on the other hand, at the peg 38. By the bias of the spring 39, the hook 32 is retained in the position illustrated in FIGS. 3 and 5, as well as in the swung-out position shown in FIG. 7, there being no need for stops. The respective end positions of the pivoting range of hook 32 are defined by the contacting of the peg 38 against the ends of the slots 37 in the proximity of the end of the tube 39.

With the aid of the pressure medium cylinder 31, the gripper 30 can be pivoted upwards in the direction of the arrow 40 in order to take over a spacer frame 18 from an overhead conveyor 19, the upper, horizontal leg 11 of the frame-like holder 8 being moved upwards at the same time. As soon as a spacer frame 18 has been taken off the overhead conveyor 19, the grippers 30 are pivoted in the direction of arrow 41 so that the hooks enter into the region of the clamping means 16 and of the locating pins 15.

As shown especially in FIG. 4, the grippers 30 are located beside the locating pins 15, respectively one clamping means 16 exhibiting a hook-like clamping element 42 being arranged between the grippers 30 and the proximate locating pins 15. The clamping means 16 can have the structure, for example, as known from FIG. 10 of DE-C No. 32 23 848 with clamping elements 42 slidingly guided in swivel bearings 43 and pivotable by means of pressure medium motors, not shown.

The locating pins 15, in the embodiment shown in FIG. 3 and FIG. 4, can be moved with the aid of a parallelogram-type drive mechanism 44 into and out of their operative position, indicated in dashed lines in FIG. 3; the locating pins can be driven by way of a shaft 45 fashioned to extend continuously over the length of the upper, horizontal leg 11 of the holder 8.

Figure 5:
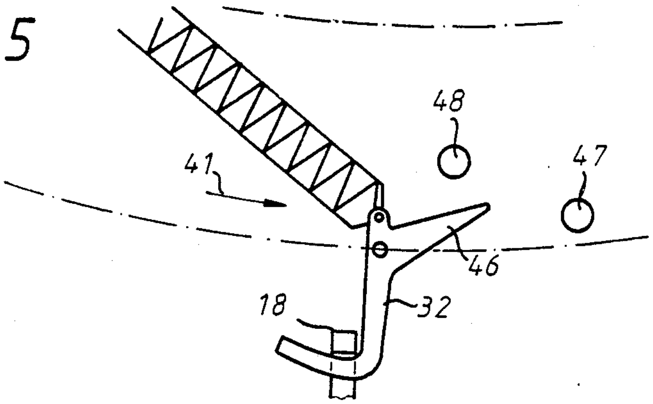

Pivoting of the hook 32 at the free ends of a gripper 30 is illustrated in FIGS. 5–7. The hook 32 is connected to an operating lever 46 for rotation therewith. This operating lever is associated (compare FIGS. 3 and 4) with two control bolts 47 and 48 affixed by way of a support 49 to the leg 11 of the frame-like holder 8.

As soon as the grippers 30 move out of the take-over position (not shown) in the direction of the arrow 41 into the delivery position, the lever 46 enters in between the control bolts 47 and 48 (FIG. 5), as is illustrated in FIG. 5, and then comes into contact with the control bolt 47 (FIG. 6). At the instant at which the lever 46 contacts the control bolt 47, the hook 32 assumes a position wherein its free end extends substantially horizontally, and the spacer frame 18 carried by this hook is in contact with the locating pin 15. By continuing the pivoting of the grippers 30 in the direction of arrow 41, the hook 32 is pivoted by the lever 46 in contact with the control bolt 47 until the hook is swung away into the position shown in FIG. 7 under the effect of the spring 39 provided in the tube 35. At this point, the spacer frame 18 is free of the grippers 30 and, respectively, their hooks 32; the frame is in contact with the locating pins 15 and stands upright at the bottom on the clamping jaws of the clamping means 16.

The clamping means 16 are now actuated, during which step the hook-shaped clamping elements 32 are pivoted and urge the spacer frame 18, preferably on all four legs of the same, against the clamping jaws of the clamping means 16. Thereupon the locating pins 15 are moved out of the range of the spacer frame 18 (by operating the shaft 45) so that the spacer frame 18 is presently ready for attachment to a glass pane 5.

It is possible, especially in the embodiment shown in FIGS. 3–7, rather than make the frame-like holder 8 approach the glass pane 5 standing at the supporting wall 1, to advance the supporting wall 1, which latter is movable in the machine frame transversely to its plane (along the lines of arrow 13 in FIG. 1), toward the frame-like holder 8 not adjustable in the machine frame transversely to its plane, until the glass pane 5 comes into contact with the spacer frame 18 and, respectively, with the coating of adhesive or sealing compound applied thereto. The final step of pressing the spacer frame against the glass pane 5 takes place in a similar way as described in DE-C No. 32 23 848, column 7, lines 9–14, the aid of pressure medium cylinders with advanceable pressure pins.

After the spacer frame 18 has been attached to the glass pane 5, the supporting wall 1 is again moved away from the frame-like holder 8. Subsequently, the grippers 30 are pivoted in the direction of arrow 40 (FIG. 3) whereby the hooks 32 are returned by pivoting to their position shown in FIG. 3 by way of their levers 36 in contact with the control bolts 48 and thus are ready for taking over another spacer frame 18.

It is understood that also in the embodiment illustrated in FIGS. 3–7 the upper, horizontal leg 11 of the frame-like holder 8 of the device according to this invention is moved into a vertical position corresponding to the level of the spacer frame 18 to be attached after a spacer frame 18 has been taken off from the overhead conveyor 19 with the aid of the grippers 30. The movement of the leg 11 of the frame-like holder 8 can take place simultaneously with the pivoting of the gripper installation according to arrow 41. It is moreover possible to perform the final portion of the stroke of the horizontal leg 11 of the frame-like holder 8 into the end position corresponding to the level of the spacer frame to be attached after the spacer frame has been inserted in the holder 8.

The grippers 30 of the embodiment according to the invention shown in FIG. 8 are fashioned to be of one piece; they have an optionally multangular form and are mounted on the shaft 22, common to all of them, for rotation therewith. For turning the shaft 22, supported at the upper, horizontal leg 11 of the holder 8, the pressure medium motor 31 is provided.

Each gripper 30 carries at its free end a hook 50 mounted to be pivotable about an axle 51 with respect to the gripper 30. The hook 50 exhibits an extension 53 projecting past the axle 51.

The hooks 50 can be pivoted upwardly about the axle 51 from the position shown in FIG. 8 by means of a pressure medium motor 52 engaging at an extension 53 of the hook 50. It is also possible to mount the hooks 50 on a common shaft pivotably supported at the free ends of the grippers 30 by means of a pressure medium motor (similarly as 52, 53).

The arrangement and configuration of the hooks 50 is such that the free ends 54 of the hooks 50 have moved out of the range of the spacer frames 18 resting against the locating pins 15 once the grippers 30 have assumed their end position wherein they are completely downwardly pivoted (take-over position, FIG. 8). In the lower end position of the grippers 30 illustrated in FIG. 8, the free ends 54 of the hooks 50 are aligned substantially horizontally and point downwardly. Except for the pivoting of the hooks 50, the function of the device of this invention corresponds to that explained with reference to FIGS. 3 and 4 of the embodiment described in FIGS. 3–7. Due to the arrangement, according to this invention, of the hooks 50 at the grippers 30, the latter can be swung, without a pivoting of the hooks 50 with respect to the grippers 30, entirely, i.e. so far into the take-over position that the hooks 50 become disengaged from the spacer frame 18, more accurately its upper, horizontal legs. Only at this point in time, i.e. for the return pivoting into the take-over position, will the hooks 50 be pivoted away, during which step the hooks, during the return pivoting into the take-over position, are again swung into their position with respect to the grippers 30 shown in FIG. 3, appropriate for taking over a spacer frame 18.

Since spacer frames 18 having relatively long, horizontal frame legs will sag with their bottom, horizontal frame leg (at the top, the frame leg is retained by the hooks of the overhead conveyor 19 or by the grippers 30), it may happen that this frame leg does not pass onto the supports of the clamping means 16, or, alternatively, the spacer frame 18 must be lifted to a very high level. In order to simplify this, lifting members in the form of brackets 55 are provided in the center of the device of this invention. These brackets 55 are pivotable at the lower, horizontal leg 10 of the frame-like holder 8 by way of angled supports 56 about an axle 57 under the action of a pressure medium motor 58 between the positions illustrated in FIG. 9 in solid lines and in dashed lines.

The flat brackets 55 advance approximately simultaneously with the grippers 17 or 30 toward the frame-like holder 8 of the device of this invention so that also otherwise sagging legs of spacer frames are securely lifted onto the clamping means 16.

What is claimed is:

1. In a device for the attachment of spaced frames to glass panes (5) during the course of the manufacture of insulating glass panes, with an essentially vertically disposed supporting wall (1) for the glass panes (5) and with a frame-like holder (8) for the spacer frames (18) arranged in front of the supporting wall (1), wherein clamping devices (16) and retractable locating pins (15) for the spacer frame to be attached are arranged on the frame-like holder (8), and wherein an upper, horizontal leg (11) of the frame-like holder (8) can be displaced upwards and downwards in parallel to the supporting wall (1); the improvement in which at least two grippers (17) are mounted on said upper, horizontal leg (I1) of the frame-like holder (8), these grippers being movable to and fro between a frame-receiving position adjacent the end of an overhead conveyor (19) for spacer frames (18) and a delivery position wherein the spacer frames are set down into contact with the locating pins (15) of the frame-like holder (8).

2. Device according to claim 1, in which the grippers (17) exhibit at least two articulately interconnected arms (20,21).

3. Device according to claim 1, in which in that a ring claw (26) is provided at a free end of each gripper (17) and, respectively of an outer arm (21) thereof, wherein at least one ring segment (28) is pivotable with respect to the other for opening and closing the ring claw (26).

4. Device according to claim 1, in which a clamp for seizing and retaining spacer frames (16), pertaining to the gripper, is provided at a free end of each gripper (17) or of an outer arm (21) thereof.

5. Device according to claim 4, in which the clamp is pivotable with respect to the gripper or the outer arm (21) thereof about a substantially horizontal axis.

6. Device according to claim 1, in which the grippers (17) are mounted on a shaft (22) common to all of them, this shaft extending in parallel to said upper, horizontal leg (11).

7. Device according to claim 1, in which the grippers (30) carry a hook (32) at their free ends.

8. Device according to claim 1, in which the hooks (32) are supported to be pivotable with respect to the grippers (30) about substantially horizontal axes, the hooks (32) exhibiting, in the inwardly pivoted position, substantially horizontally oriented free ends and, in the outwardly pivoted position, substantially vertically oriented free ends.

9. Device according to claim 8, in which each hook has an extension (34) projecting past a pivot axle (33) of the hook, this extension being under the effect of a compression spring (39) supported against the gripper (30).

10. Device according to claim 9, in which the spring (39) is received in a tubular section (35) which exhibits, at its end lying opposition an end joined to an extension (34) of the hook (32) by way of a joint(36), slots (37) penetrated by a peg (38) connected with the grippers (30).

11. Device according to claim 1, the final positions of the hooks (32) with respect to the grippers (30) are secured by spring means.

12. Device according to claim 1, in which in that a lever (46) is connected with the hook (32) for rotation therewith, preferably with its, this lever cooperating with control bolts (47 and 48, respectively) provided on the upper, horizontal leg (11) of the holder (8), for the outward pivoting of the hook (32) and, respectively, for the return pivoting of the hook (32) into the inwardly swung position.

13. Device according to claim 12, in which the lever (46) connected with the hook (32) comes into contact with the control bolt (47) effecting the outward pivoting of the hook (32) as soon as the spacer frame (18) carried by the hooks (32) comes into contact with the locating pins (15) advanced into their operative position.

14. Device according to claim 1, in which free ends (54) of the hooks (50) hooks (50) are aligned essentially horizontally in the lower end position of the grippers (30) and are arranged below the section of the hooks (50) by way of which the hooks are pivotably attached to the grippers (30).

15. Device according to claim 14, in which the free ends (54) of the hooks (50) are, in the lower end position of the grippers (30), out of engagement with the spacer frames (18) in contact with the locating pins (15).

16. Device according to claim 14, in which the hooks (50 are extended (53) past a hook swivel axle (51), and that a pressure medium motor (52) engages at the end of the extension (53).

17. Device according to claim 14, in which the hooks (50) are pivotable so as to reduce the angle between them and the gripper (30).

18. Device according to claim 17, in which the lifting members (55) are brackets open at the top, these brackets being arranged on said lower, horizontal leg (10) to be pivotable about a horizontal axle (57).

19. Device according to claim 18, in which the brackets exhibit a curved section and a linear section, the transition between the curved and linear sections being located, with the bracket swung upwardly, beside the clamping devices (16) for the spacer frame (18) disposed at said lower leg (10).

20. Device according to claim 1, in which at least one lifting member (55) is provided on a lower, horizontal leg (10) of the frame-like holder (8) for lifting a lower, horizontal frame leg of a spacer frame (18).

21. Device according to claim 20, in which the lifting member (55) or the lifting members (55) are preferably provided in a central zone of the leg (10).

22. Device according to claim 1, in which the locating pins are retained on the leg (11) of the frame-like holder (8) by way of parallelogram-type guide means (44), the locating pins being liftable and lowerable into and out of their operative position by means of a common operating shaft (45) for the parallelogram-type guide means (44)

23. Device according to claim 1, in which the frame-like holder (8) is arranged, transversely to a plane defined by this holder, fixedly on the machine frame, and that the supporting wall (1) for the glass pane (5) to which a spacer frame (18) is to be attached is displaceably guided transversely to the plane of the glass pane (5) (arrow 13) in the machine frame toward and away from the frame-like holder (8).

* * * * *